June 12, 1962 J. H. READING 3,038,811
BOIL-IN-THE-WRAPPER FOOD PRODUCT AND
WRAPPING MATERIAL THEREFOR
Filed March 3, 1959
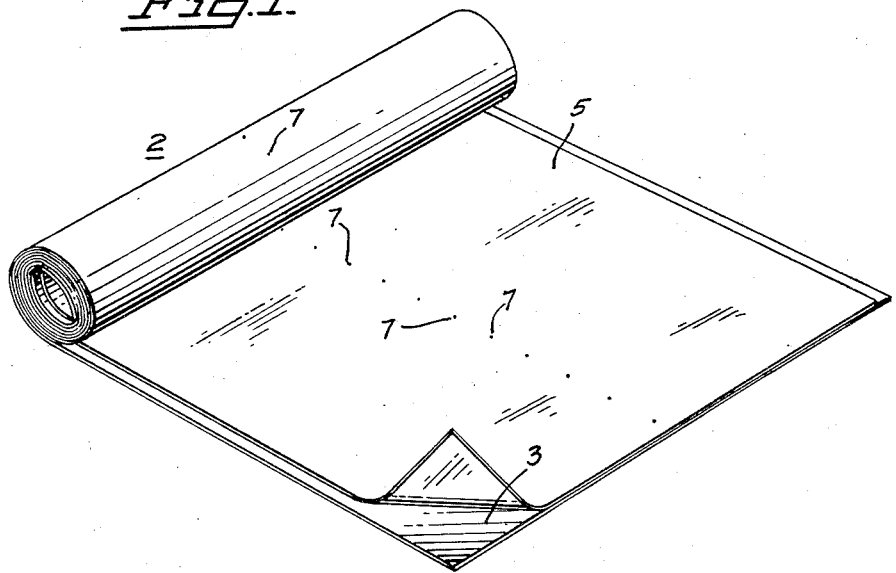
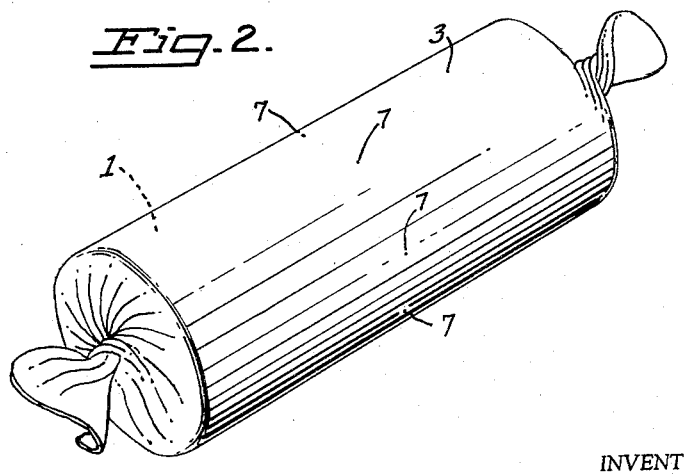
INVENTOR.
JOHN H. READING
BY
Bruce & Brosler
HIS ATTORNEYS

United States Patent Office 3,038,811
Patented June 12, 1962

3,038,811
BOIL-IN-THE-WRAPPER FOOD PRODUCT AND
WRAPPING MATERIAL THEREFOR
John H. Reading, 4735 Sequoyah, Oakland 5, Calif.
Filed Mar. 3, 1959, Ser. No. 796,835
8 Claims. (Cl. 99—171)

My invention relates to packaging and more particularly to the preparation for the market of edible products to be prepared by boiling.

The invention is primarily concerned with the wrapping of edible products which are to be prepared by boiling, such as oatmeal and similar hot breakfast foods, fruit rolls, tamales, etc., all of which may be of a soft consistency but with sufficient body to enable the same to be wrapped.

Heretofore, such edible products as tamales have been wrapped by rolling them in wrapping material such as paper provided with a glassine or the like liner, but to avoid opening of the wrappers and possible leakage, when the product was boiled in its wrapper, the ends of the wrappers had not only to be twisted, but also had to be securely bound as by tying or wiring.

The present invention has among its objects:

(1) To provide novel and improved wrapping material for products to be boiled in their wrappers, which will eliminate the former necessity of tying the twisted ends of the wrappers;

(2) To provide a novel and improved wrapped edible product adapted to be prepared by boiling in its wrapper.

Additional objects of my invention will be brought out in the following description of a preferred embodiment of the same taken in conjunction with the accompanying drawings wherein:

FIG. 1 is a three dimensional view of wrapping material involved in the present invention, exaggerated as to thickness to illustrate the features involved;

FIG. 2 is a three dimensional view of the product having a wrapper of the material of FIG. 1.

The product 1 to be wrapped may be hand rolled, or extruded and cut to size in preparation for wrapping.

The wrapping material 2 may comprise a layer of paper 3, preferably of the type known as vegetable parchment paper, such layer of paper having a non-resilient vapor barrier covering 5 which, in the preferred form of the invention will constitute a lamination of aluminum or other metallic foil, since such foils are in general, non-resilient to the point of being lifeless, and will at all times impart body to the wrapping material.

The wrapping material as thus formed is then provided with a plurality of spaced perforations 7 preferably along the longitudinal axis of the material. Such perforations may be quite small, pin pricks being entirely adequate for purposes of the present invention.

The wrapping material as thus fabricated may be in sheet form cut to size, or in the form of rolls from which pieces may be cut to a desired length. This latter form of wrapping is better suited for automatic machine operation.

The width of the wrapping material should exceed the length of the product to be wrapped, the product being rolled in the wrapping material with the series of perforations encircling the product, preferably intermediate the ends thereof. The number and location of such perforations are not critical, so long as they permit of adequate release of pressure.

The overhanging ends of the wrapping material are then twisted to close the ends of the product against exposure and leakage. The non-resilient lifeless character of the vapor barrier lamination will, in the absence of any applied forces, retain the ends in their twisted state and discourage the same from unwinding of their own accord.

In twisting the overhanging ends of the wrapping, the foil lamination is apt to be subjected to tearing stresses. I have found that tearing under these conditions can be minimized through the use of a polyethylene adhesive in bonding the foil to the outer paper layer, because of inherent characteristics of such adhesives, which also substitute as a vapor barrier for the foil, should a crack or tear develop therein.

When a product as thus wrapped, is placed in boiling water to prepare the same for eating, pressures, due to vapor, however, may be generated or developed within, which in attempting to escape, will tend to force open the wrapper and expose the product. This accounts for the fact that prior practice dictated the binding of the twisted ends to resist such forces.

I have found, however, that with the perforations provided in the wrapper, sufficient release of such developed pressures may be realized to permit the non-resilient vapor barrier lamination to resist untwisting of the twisted ends, without the necessity of binding such twisted ends as was previously required.

Perforations made by pin pricking the material are preferred, in that no material is removed and the minute tabs or serrated edges generally formed can function as valves in releasing pressures developed within the product, while at other times maintaining the perforations substantially closed.

Thus not only is there a considerable saving in time, labor and material over that previously required in the binding of the twisted ends of such a wrapper, but following the boiling of such a product in its wrapper, the facility with which the wrapper may be removed, minimizes the handling of the hot product in removing the wrapper therefrom.

Thus, the combination in a wrapping material of a non-resilient vapor barrier lamination or covering, and perforations through the wrapping material, has solved a real problem in the wrapping of soft edible products to be prepared by boiling the same in its wrapper.

While I have disclosed my invention in its preferred form, it is apparent that the same is subject to modification and alteration without departing from the underlying principles involved, and I accordingly do not desire to be limited in my protection to the specific details illustrated and described except as may be necessitated by the appended claims.

I claim:

1. A wrapped edible product adapted to be boiled in its wrapper, comprising a product of soft consistency rolled in wrapping material of a width exceeding the length of said product, with the resulting overhanging portions of said wrapping material at each end brought together to cover each end of said product and form a closure incapable by itself of withstanding vapor pressures developed during boiling but having no inherent tendency to open, said wrapping material including an outer paper layer susceptible to permeation by vapor, said outer layer having on its inner surfaces a non-resilient vapor barrier lamination, and a sufficient number of pin-hole perforations through said wrapping material between the closed ends of said wrapper to enable release of interior pressure when the wrapped product is boiled to prevent opening of the closures formed by the wrapping material at each end of the product, said perforations being formed by a piercing process without appreciable removal of the wrapping material.

2. A wrapped edible product adapted to be boiled in its wrapper, comprising a product of soft consistency rolled in wrapping material of a width exceeding the length of said product, with the resulting overhanging portions of said leak proof wrapping material at each end brought together to cover each end of said product and form a closure incapable by itself of withstanding vapor pressures developed during boiling but having no inherent tendency to open, said wrapping material including an outer layer of vegetable parchment paper having a non-resilient vapor barrier lamination secured thereto on its inner surface, and a sufficient number of pinhole perforations through said wrapping material between the closed ends of said wrapper to enable release of interior pressure when the wrapped product is boiled to prevent opening of the closures formed by the wrapping material at each end of the product, and valve means normally substantially closing each of said perforations, each of said valve means including at least one tab means formed of the wrapping material extending inwardly of the corresponding perforation from the edge thereof.

3. Wrapping material for an edible product of soft consistency to be boiled in its wrapper, said wrapping material comprising a layer of vegetable parchment paper having a vapor barrier lamination of non-resilient foil secured thereto and a plurality of pin-hole perforations through said layer and said lamination with tabs of said material extending inwardly from the edges of said perforations substantially closing said perforations to function as pressure release valves during boiling of such a wrapped product, said wrapping material being in roll form with said perforations running longitudinally of said wrapping material along an intermediate region thereof.

4. Wrapping material for an edible product of soft consistency to be boiled in its wrapper, said wrapping material comprising a layer of paper having a vapor barrier lamination of non-resilient material over a surface thereof, said lamination having an inherent ability to resist any tendency to open the wrapping material when an edible product is wrapped therein, with the wrapping material brought together at each end of the product to form a closure, and a plurality of pin-hole perforations through said layer and said lamination to enable release of interior pressure when the product is boiled in its wrapping to prevent opening of the wrapping material at each end of the product, said perforations being formed by a piercing process without appreciable removal of the wrapping material, said wrapping material being in roll form and of a width greater than the length of the product to be wrapped, with said perforations running longitudinally of said wrapping material along an intermediate region thereof.

5. The structure defined in claim 1, in which the layer is formed of vegetable parchment paper and the lamination is formed of aluminum foil.

6. The structure defined in claim 1, in which the closures are formed by a twist in the overhanging portions of the wrapping material.

7. The structure defined in claim 2, in which the lamination is formed of aluminum foil.

8. The structure defined in claim 4, in which the lamination is formed of aluminum foil.

References Cited in the file of this patent

UNITED STATES PATENTS

| | | |
|---|---|---|
| 1,998,506 | Jones | Apr. 23, 1935 |
| 2,000,528 | Linderman | May 7, 1935 |
| 2,003,494 | Reynolds | June 4, 1935 |
| 2,054,274 | Sullivan | Sept. 15, 1936 |
| 2,226,589 | Smyers | Dec. 31, 1940 |
| 2,441,477 | Farrell | May 11, 1948 |
| 2,496,934 | Carson | Feb. 7, 1950 |
| 2,544,146 | Erikson | Mar. 6, 1951 |
| 2,633,284 | Moffett et al. | Mar. 31, 1953 |
| 2,679,969 | Richter | June 1, 1954 |
| 2,715,089 | Michenen et al. | Aug. 9, 1955 |
| 2,900,258 | Wagner | Aug. 18, 1959 |

OTHER REFERENCES

"Food," October 1956, page 380.
"Food," Engineering, May 1957, page 22.